US012224076B2

(12) United States Patent
Hansen et al.

(10) Patent No.: US 12,224,076 B2
(45) Date of Patent: Feb. 11, 2025

(54) SYSTEM AND METHOD FOR PYROLYSING ORGANIC WASTE

(71) Applicants: ASX INVESTMENTS B.V., Kronenberg (NL); BELGOPROCESS, Dessel (BE)

(72) Inventors: Jurgen Hansen, Overpelt (BE); Jan Deckers, Sint-Gillis-Waas (BE)

(73) Assignees: ASX INVESTMENTS B.V., Kronenberg (NL); BELGOPROCESS, Dessel (BE)

( * ) Notice: Subject to any disclaimer, the term of this patent is extended or adjusted under 35 U.S.C. 154(b) by 948 days.

(21) Appl. No.: 17/289,467

(22) PCT Filed: Oct. 30, 2019

(86) PCT No.: PCT/EP2019/079741
§ 371 (c)(1),
(2) Date: Apr. 28, 2021

(87) PCT Pub. No.: WO2020/089341
PCT Pub. Date: May 7, 2020

(65) Prior Publication Data

US 2021/0398705 A1 Dec. 23, 2021

(30) Foreign Application Priority Data

Oct. 31, 2018 (BE) .................................. 2018/5760

(51) Int. Cl.
*G21F 9/32* (2006.01)
*F23G 5/027* (2006.01)
(Continued)

(52) U.S. Cl.
CPC ............... *G21F 9/32* (2013.01); *F23G 5/027* (2013.01); *F23G 5/04* (2013.01); *F23G 5/30* (2013.01);
(Continued)

(58) Field of Classification Search
CPC ............. F23G 2203/50; F23G 2201/30; F23G 2200/00; F23G 5/36; F23G 5/30; F23G 5/027
See application file for complete search history.

(56) References Cited

U.S. PATENT DOCUMENTS

| | | | | |
|---|---|---|---|---|
| 5,789,636 A * | 8/1998 | Holighaus | C10B 57/06 201/22 |
| 6,084,147 A | 7/2000 | Mason | |

FOREIGN PATENT DOCUMENTS

| | | | |
|---|---|---|---|
| GB | 1 577 383 A | 10/1980 | |
| JP | 2001198562 * | 7/2001 | A62D 3/17 |

(Continued)

OTHER PUBLICATIONS

Rowland, Design and testing of a small-scale updraft gasifier for gasification of eastern redcedar. Oklahoma State University, 2010 (Year: 2010).*

(Continued)

*Primary Examiner* — Daniel Berns
*Assistant Examiner* — Eric Scott Sherman
(74) *Attorney, Agent, or Firm* — Lewis Roca Rothgerber Christie LLP

(57) ABSTRACT

The invention provides a system for pyrolysing organic waste. The system comprises a conical housing (4) configured to temporarily, substantially hermetically, enclose the waste and a mixing device provided with a drive shaft rotatably mounted relative to the housing and a conical mixing body (25) configured inside the housing to fluidise the waste, which mixing body fixedly attached substantially does not touch the housing. The system further comprises heating means (24) for heating the side wall of the housing. This system makes it possible to carry out the processing of organic waste in a batch process. The mixing body prevents a portion of the waste from sticking together by fluidising
(Continued)

the waste and keeping it fluidised, whereby the heat generated by the heating means can gradually spread through the waste inside the housing.

12 Claims, 6 Drawing Sheets

(51) Int. Cl.

| | |
|---|---|
| ***F23G 5/04*** | (2006.01) |
| ***F23G 5/30*** | (2006.01) |
| ***F23G 5/36*** | (2006.01) |
| ***F23G 5/44*** | (2006.01) |

(52) U.S. Cl.

CPC ................. *F23G 5/36* (2013.01); *F23G 5/44* (2013.01); *F23G 2200/00* (2013.01); *F23G 2201/10* (2013.01); *F23G 2201/302* (2013.01); *F23G 2203/50* (2013.01); *F23G 2209/12* (2013.01); *F23G 2209/26* (2013.01)

(56) References Cited

FOREIGN PATENT DOCUMENTS

| | | | | |
|---|---|---|---|---|
| JP | 3895980 | * | 3/2007 | .............. C02F 11/10 |
| JP | 2017-142210 A | | 8/2017 | |
| JP | 2017142210 | * | 8/2017 | ............... G21F 9/02 |
| WO | WO 87//01502 A1 | | 3/1987 | |

OTHER PUBLICATIONS

International Search Report and Written Opinion for corresponding PCT Application No. PCT/EP2019/079741, mailed Jan. 14, 2020 (10 sheets).

* cited by examiner

SYSTEM AND METHOD FOR PYROLYSING ORGANIC WASTE

CROSS-REFERENCE TO RELATED APPLICATIONS

This application is a U.S. National Phase Patent Application of International Patent Application Number PCT/EP2019/079741, filed on Oct. 30, 2019, which claims priority to Belgian Patent Application Number BE2018/5760, filed on Oct. 31, 2018, the entire content of each of which is incorporated herein by reference.

TECHNICAL FIELD

The present invention relates to a system for pyrolysing organic waste into pyrolysed material and gasified material. The present invention also relates to a method system for pyrolysing organic waste into pyrolysed material and gasified material.

PRIOR ART

The nuclear industry annually produces an amount of waste that is classified as radioactively contaminated ion exchange media (i.e. resin), sludge and solvents. Resin is an organic material. The base is usually a styrene polymer to which are grafted sulfonic acid and/or amine groups. The resin is therefore flammable, but when oxygen gas is supplied during combustion, sulphur and nitrogen oxides are formed which in turn must be somehow separated. In addition, the temperature rise is sufficiently high during combustion to allow radioactive caesium to partially evaporate. The resulting gases and fly ashes can therefore be significantly contaminated as a result of the radioactivity of the resins to be processed, which requires a highly efficient filter system. Accordingly, both technical and economic problems are associated with combustion of ion exchange media.

An alternative processing method to combustion is pyrolysis as described in GB-B-1577383 and U.S. Pat. No. 6,084,147. Pyrolysis takes place in an inert atmosphere at a temperature between 400° C. to 850° C., whereby a decomposition of the molecules, i.e. a mineralisation, occurs. Due to the significantly lower temperature in comparison with combustion and the absence of oxygen, the residual products from the resins remain in the pyrolysis reactor. The transfer of various radioactive isotopes, for example caesium, to the exhaust gas is also significantly lower to non-existent.

A known method of processing medium into highly radioactive resins using pyrolysis comprises three sequential steps as described in GB-B-1577383. In the first phase, the resins are dried. Namely, it is usual for the resins to be transported as a suspension in water, typically in a 70/30 volume ratio of resin to water. After drying, the resins undergo pyrolysis, wherein the resins are usually subjected to a counter-current of superheated steam in a reactor vessel, which is carried out as a continuous process. This pyrolysis leads to a small volume of solid residue containing the vast majority of the radionuclides and pyrolysis gas. This pyrolysis gas then undergoes thermal post-combustion at temperatures between 800° C. and 1100° C. as described below.

JP-A-2017/142210 discloses a pyrolysis reactor that can be used for the processing of radioactive resins. Specifically, JP-A-2017/142210 discloses a cylindrical reactor vessel in which a plurality of ceramic or metal balls are present in combination with a mixing body. The balls are fluidised by the mixing body, the balls moving upwards along the wall of the reactor vessel and down centrally in the reactor vessel. The wall of the cylindrical reactor vessel is heated electrically. In this way the ceramic balls have a substantially uniform temperature between 400° C. and 700° C. Superheated steam is introduced at the bottom side of the reactor vessel, while the dried resins are added to the top of the reactor. The contact of the resins with the superheated steam and the heated ceramic balls provides the pyrolysis reaction from which a granular residue forms. The cylindrical reactor vessel has a conical section on its underside for the collection of this residue.

There are a number of disadvantages to the reactor disclosed in JP-A-2017/142210. First of all, the mixing body must be of sufficiently robust design that the ceramic balls can be fluidised, which is particularly difficult due to the high frictional forces associated with the ceramic balls. Such a mixing body means that support must be provided for the mixing body both at the top and at the bottom of the reactor so that the mixing body can exert sufficient force on the ceramic balls. Specifically, the underside of the mixing body is supported on a grid fixedly mounted in the cylindrical reactor vessel, which grid comprises a plurality of concentric annular recesses that partially guide the mixing body. Such a multiple guidance on the underside is crucial because of the relatively high forces required for fluidising the ceramic balls. However, the alignment between the mixing body and the lower grid is not obvious since the temperatures can be high in the reactor, namely up to 700° C., as a result of which both the grid and the mixing body, both made of metal, expand, which expansion is not necessarily the same for the grid and the mixing body. The alignment must therefore take into account the specific expansion of both the grid and the mixing body.

A further disadvantage of the reactor disclosed in JP-A-2017/142210 is that the ceramic balls can lead to blockages of the mixing body. In such situations, waste processing must be stopped so that the blocking can be remedied. The removal of such a blocking must be carried out manually and is therefore not obvious since the reactor vessel usually contains radioactive substances, which entails serious contamination risks. The ceramic or metal balls also wear out over time, so that replacement thereof becomes necessary. In addition, the worn balls themselves also constitute radioactive waste that must be processed.

Furthermore, the reactor disclosed in JP-A-2017/142210 has problems with the residence time of the resins. In particular, the resins fall through the reactor due to gravity. Although the counter-current of superheated steam partly compensates for gravity, the residence time in the reactor will always be limited.

DESCRIPTION OF THE INVENTION

It is an object of the present invention to provide for processing of organic waste by pyrolysis, wherein the residence time of the waste in a pyrolysis chamber can be controlled more accurately.

This object is achieved by means of a system for pyrolysing organic waste into pyrolysed material and gasified material, which system comprises: a frame; a conical housing mounted on the frame and configured to temporarily, substantially hermetically, enclose said waste, which housing has a longitudinal direction, a side wall, an upper side and an underside and is provided with: an inlet configured to communicate with a supply device to introduce said waste into the housing; an outlet configured to communicate with a discharge device for discharging said pyrolysed material from the housing, which outlet is provided on the underside of the housing; and a gas outlet configured to communicate with a gas discharge device for discharging said gasified material from the housing, a cross-section through the conical housing having a surface which substantially perpendicular to said longitudinal direction decreases downwards; a mixing device mounted on the frame and provided with: a drive shaft rotatably mounted relative to the housing, said drive shaft extending through the upper side of the housing along said longitudinal direction with a first portion located inside the housing and a second portion located outside the housing; and a conical mixing body inside the housing and configured to fluidise said waste, which mixing body is fixedly attached to the first portion of the drive shaft and substantially does not touch the housing; and heating means for heating the side wall of the housing.

By providing a system with a conical housing that can be sealed substantially hermetically in combination with a conical mixing body, it is possible to carry out the processing of organic waste in a batch process. Specifically, a certain amount of waste is introduced into the housing after which it is made substantially hermetically sealed until the total amount of waste is pyrolysed. The mixing body prevents a portion of the waste from sticking together by fluidising the waste and keeping it fluidised, whereby the heat generated by the heating means can gradually spread through the waste inside the housing.

In addition, there is no longer any need for ceramic or metal balls in the housing, which were necessary in the known processing installation to release sufficient heat to the waste in the short residence time. Hence, there is no need to support the mixing body on the inside of the housing, which also simplifies the design of the system. This simplification also makes it easier to maintain and clean the system. Furthermore, the housing can also be of relatively small design with respect to the known housings, which must be sufficiently long to obtain a sufficiently long residence time.

There is also no need for the organic waste supplied to have already been dried. Specifically, if the supplied waste is wet, the housing can remain closed for a longer period. This longer period makes it possible to first evaporate the waste inside the same housing and then dry it and then pyrolyse it.

Furthermore, the hermetically sealed housing allows the processing of radioactive waste, in particular radioactive resin or radioactive sludge, or other typical waste.

In an embodiment of the present invention, the second portion of the drive shaft is rotatably mounted on said frame by means of at least two bearings.

Such a mounting allows the mixing device to be mounted in its entirety on and supported on the frame. In other words, no support is required on the conical housing, so that it can be made as light as possible. Furthermore, in this embodiment there is also no need to provide a rotatable seal between the drive shaft and the upper side of the housing.

In an embodiment of the present invention, the mixing body has a free bottom side that is at substantially the same height as the underside of the housing.

In this embodiment, a portion of the organic waste to be processed is prevented from accumulating beneath the mixing body on the underside of the housing. Such accumulated waste typically leads to partially unprocessed waste, which, in particular with radioactive waste, should be avoided.

In an embodiment of the present invention, a shortest distance between the side wall of the housing and the mixing body measured in a cross-section through the conical housing which is substantially perpendicular to said longitudinal direction amounts to at most 5% and in particular at most 3% of the maximum internal diameter of the housing. Preferably, said shortest distance is substantially independent of the height at which the section is taken.

It has been found that the distance between the mixing body and the housing should ideally be as small as possible in order to prevent waste from being able to affix itself to the conical housing. Such fixed material lowers the efficiency of waste processing and can also lead to partially unprocessed waste, which should be avoided, in particular in the case of radioactive waste.

In an embodiment of the present invention, the mixing body is attached to said shaft with one or more cross connections such that, in use, the mixing body is configured to transport said waste upwards along the side wall of the housing.

An upward transport along the side wall is advantageous since the side wall is heated by the heating means, whereby the heat transfer between the heating means and the waste inside the housing is optimised.

In an embodiment of the present invention, the heating means comprise electrical heating elements mounted on, preferably integrated into, the outside of the side wall of the housing, the electrical heating elements being configured to generate a temperature within the housing of at least at least 200° C., in particular at least 300° C., more in particular at least 400° C. and most in particular at least 500° C.

Electric heating means provide direct heat and do not need a heat transfer medium such as thermal oil or combustion by an additional fuel, and are therefore less polluting and much safer. The desired temperature is typically dependent on the processing phase (i.e. evaporation, drying or pyrolysis) the system is in and is preferably as low as possible.

In an embodiment of the present invention, the system further comprises an inertisation device with at least one storage tank in which nitrogen gas is stored, the inertisation device comprising a plurality of conduits configured for supplying nitrogen gas to near each aperture in the housing.

The use of nitrogen gas forms an inexpensive and easy-to-implement system for substantially hermetically sealing the housing so that the atmosphere within the conical housing remains substantially free of oxygen (i.e. remains inert).

In an embodiment of the present invention, the mixing device further comprises a drive, in particular an electric motor, configured for rotating the drive shaft, which drive is located outside said housing.

Providing the drive of the mixing device outside the housing is advantageous with respect to a drive located inside the housing. In particular, the chance of contamination is much lower, whereby the volume inside the housing can also be optimally utilised for processing the waste.

In an embodiment of the present invention, the inlet of the housing is closed by a first sluice valve device and wherein the outlet of the housing is closed by a second sluice valve device.

The use of sluice valves for closing the inlet and the outlet of the housing is a simple way to guarantee a substantially hermetic seal of the inlet and the outlet during use.

In an embodiment of the present invention, there are no ceramic and/or metal balls present within the housing.

The absence of ceramic and/or metal balls allows the mixing body on the inside of the housing to be left completely free, which simplifies the design of the system.

This object is also achieved by means of a method for drying and pyrolysing organic waste into pyrolysed material and gasified material, said method comprising the following steps: a) introducing said waste into a housing; b) after step a), substantially hermetically sealing the housing; c) fluidising said waste within the housing by rotating a mixing body; d) heating the housing for heating said waste to successively evaporate, dry and pyrolyse the waste; e) extracting said gasified material from the housing; f) collecting said pyrolysed material at the bottom of the housing until said waste is completely pyrolysed; and g) unlocking the housing to remove the collected pyrolysed material.

By providing a method in which the waste is sealed substantially hermetically in a housing in combination with fluidising the waste within the housing, it is possible to carry out the processing of organic waste in a batch process. Specifically, a certain amount of waste is introduced into the housing after which it is hermetically sealed and remains sealed until the total amount of waste is dried and pyrolysed. The mixing body prevents a portion of the waste from sticking together by fluidising the waste and keeping it fluidised, allowing the heat to spread steadily through the waste inside the housing for both the drying and pyrolysis of the waste. Hence there is no need to carry out drying and pyrolysis in separate waste processing facilities.

In an embodiment of the invention, step d) comprises gradually increasing the temperature of the housing from an ambient temperature to at least 200° C., in particular at least 300° C., more in particular at least 400° C. and most in particular at least 500° C.

The controlled increase of the temperature results in a more controllable process. In particular, the amount of waste gas is more controllable as opposed to substantially instantaneous heating, whereby more waste gas is produced in a short time.

Preferably, step d) further comprises adjusting the temperature based on the waste processing process.

This allows the temperature to be adjusted depending on the already reached stage in the waste processing process, i.e. evaporation, drying or pyrolysis.

In an embodiment of the invention, step c) comprises transporting said waste upwards along the side wall of the housing.

An upward transport along the side wall is advantageous since the side wall can most easily be heated by heating means, whereby the heat transfer between the heating means and the waste inside the housing is optimised.

In an embodiment of the invention, step d) comprises heating the housing for heating said waste to successively evaporate, dry and pyrolyse the waste.

In this embodiment, the organic waste can be introduced into the housing together with its transport water, whereby, in a first phase, the transport water is evaporated.

In a preferred embodiment of the invention, the gas discharge device is connected to an oxidiser for thermally oxidising a waste gas with hydrocarbon compounds into an oxidised gas, which oxidiser comprises: an outer chamber with a front wall, a rear wall, a left wall, a right wall, an upper wall and a lower wall which are provided on their inner side with electrical heating means, the outer chamber being provided with a first opening and a second opening, wherein a depth of the outer chamber is defined as a shortest distance between its front wall and its rear wall, wherein a width of the outer chamber is defined as a shortest distance between its left wall and its right wall and wherein a height of its outer chamber is defined as a shortest distance between its lower wall and its upper wall; and an inner chamber that is completely surrounded by the outer chamber and has a depth, a width and a height, each of which is at most 15%, in particular at most 10%, smaller than a respective one of the depth, the width and the height of the outer chamber, the inner chamber being provided with: an inlet configured to communicate, via the first opening in the outer chamber, with a supply device provided to supply a mixture of superheated oxygen gas and said waste gas to the inner chamber; an outlet configured to communicate, via the second opening in the outer chamber, with a discharge device provided to discharge said oxidised gas from the inner chamber; and one or more partitions such that said mixture flows through one or more substantially U-shaped loops within the inner chamber.

By building the oxidiser as an inner chamber for the oxidation of the waste gas in a heated outer chamber, the entire inner chamber is brought to the required temperature. There is therefore no risk that, for example during the start-up of the oxidation, an amount of waste gas was not exposed to a sufficiently high temperature. In addition, the electric heating elements do not require the combustion of an additional fuel, for example oil or gas, and are therefore less polluting. In addition, the volume of steam is more limited since no additional combustion air is required for the additional fuel. The combustion of gas and in particular oil also generate gases that must be treated further. An electric oxidiser thus results in a smaller oxidiser in comparison with existing oxidisers that use an igniter and must have sufficient volume for the additional combustion air. Avoiding combustion air also means that a simpler waste gas treatment system can be used. In addition, there are also fewer safety risks associated with the electric heating elements in comparison with an oxidiser that uses an igniter.

The one or more partitions increase the residence time of the mixture in the inner chamber compared to an identically dimensioned chamber without partitions with the same inflow rate. In other words, the inner chamber, and therefore the outer chamber, can be made smaller by using one or more partitions to still obtain the same residence time for the same inflow speed. In addition, the one or more U-shaped loops, which are the direct result of the partitions, contribute to the mixing of the waste gas and the superheated oxygen gas.

The inner chamber can also be replaced in its entirety without compromising the structural integrity of the outer chamber, which normally does not come into direct contact with waste gas. In other words, in the case of contamination and/or damage to the inner chamber, it can easily be replaced or maintained.

Furthermore, the dimensions of the inner chamber are chosen in such a way compared to the outer chamber that there is as little volume as possible between the chambers without them being able to come into contact with each other considering the high temperatures to which the chambers are exposed.

In addition, the oxidiser is suitable for the processing of waste gas that is the result of pyrolysis of organic waste, in particular radioactive waste and more in particular radioactive resin or radioactive sludge or other waste.

In a preferred embodiment of the present invention, one of the inner walls of the inner chamber and one side of one of said partitions are each provided with heat-resistant insulation panels for insulating a first section of the U-shaped loop closest to the inlet.

The portion of the inner chamber closest to the inlet provided with heat-resistant insulation panels provides additional protection to the portion of the inner chamber that is exposed to the highest temperatures without having to drastically increase the design of the oxidiser as opposed to providing heat-resistant insulation panels on each wall within the inner chamber.

In a preferred embodiment of the present invention, the outer chamber is further provided with a third opening and the inner chamber with a gas inlet configured to communicate, via the third opening in the outer chamber, with a urea supply device provided for supplying urea to the inner chamber. Preferably, said gas inlet is provided after the U-shaped loop closest to the inlet.

The introduction of urea into the inner chamber during the processing of waste gas prevents the formation of nitrogen oxides. Adding the urea to the start of the oxidiser ensures that the formation of nitrogen oxides is avoided throughout substantially the entire inner chamber. In this way the oxidiser also acts as a DeNOx installation.

In a preferred embodiment of the present invention, the inner sides of the walls of the outer chamber are provided with ceramic elements in which the electrical heating means are incorporated, said elements being provided with heat-resistant insulation on their side facing the outer chamber The ceramic insulation panels make it possible to use the heat generated by the heating means more efficiently, i.e. the insulation panels limit the heat loss to the environment. The incorporation of the heating means into the insulation panels also limits the space required on the inner side of the outer chamber so that the inner chamber can be of maximum design.

In a preferred embodiment of the present invention, said inner chamber is made entirely of heat-resistant metal.

In a preferred embodiment of the present invention, an odd number of partitions are provided, wherein said inlet and said outlet are provided in the same wall of the inner chamber and wherein, preferably, said first opening and said second opening are provided in the same wall of the outer chamber.

The provision of an odd number of partitions makes it possible to provide the inlet and the outlet in the same wall, whereby the first and the second opening in the outer wall can also be provided in the same wall, whereby additional insulation around the openings can be limited to one wall.

In a preferred embodiment of the present invention, fastening means are provided with which the inner chamber is attached to the outer chamber, which fastening means are configured such that the inner chamber substantially does not come into contact with the inner side of the outer chamber. Preferably, said fastening means comprise one or more supporting elements positioned between the lower wall of the outer chamber and a lower wall of the inner chamber.

The provision of support elements between the lower walls of the outer and the inner chamber forms a very simple connection so that the inner chamber is not in direct contact with the outer chamber and whereby sufficient play can also be provided so that the inner chamber is not, even at high temperatures, in contact with the outer chamber.

In a preferred embodiment of the present invention, the oxidiser further comprises said supply device configured to supply said mixture at a speed of at least 1 m/s and at most 5 m/s into the inner chamber. Preferably, said U-shaped loops have a joint overall length such that the residence time of said waste gas in the inner chamber is at least 2 seconds. Preferably, said supply device comprises a superheater configured to superheat oxygen gas, in particular air, more in particular ambient air, to a temperature of at least 850° C., preferably at least 900° C. and in particular to almost 1000° C.

Superheating the supplied air, in particular the oxygen gas therein, limits the required residence time since the mixture substantially does not need to be heated further.

In a further preferred embodiment of the present invention, said supply device comprises a control mechanism configured to control an amount of oxygen gas in said mixture, which amount is at least 6 vol %. Preferably, said control mechanism comprises a control device in said discharge device, which control device is configured to determine the amount of oxygen gas in said oxidised gas, the control mechanism being further configured to control the amount of oxygen gas in said mixture based on the determined amount of oxygen gas in said oxidised gas.

The control device allows at least 6 vol % oxygen gas to be present at all times in the waste gas mixture to be processed throughout the entire length of the inner chamber.

In a preferred embodiment of the present invention, said partitions are alternately attached to opposite walls of the inner chamber, wherein, preferably, each partition has a length that is at most 95% of a shortest distance between said opposite walls.

Such an alternating attachment makes it possible in a simple manner to obtain the desired U-shaped loops for the flow of said mixture.

BRIEF DESCRIPTION OF THE DRAWINGS

The invention will hereafter be explained in further detail by way of the following description and the accompanying drawings.

EMBODIMENTS OF THE INVENTION

Figure 1:
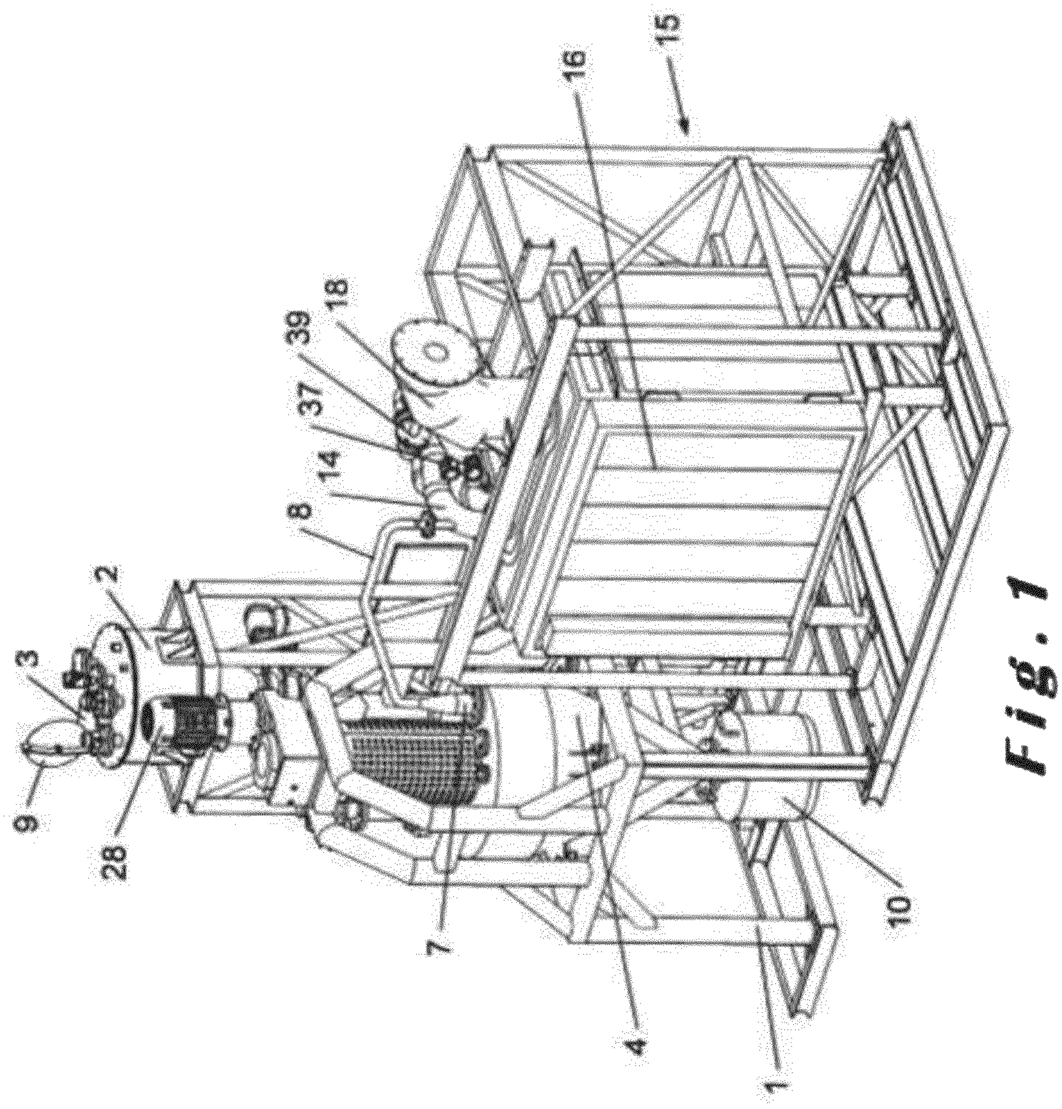
FIG. 1 shows a perspective view of a system for processing organic resin according to the present invention.

Although the present invention will hereinafter be described with respect to particular embodiments and with reference to certain drawings, the invention is not limited thereto and is only defined by the claims. The drawings shown here are merely schematic representations and are not limiting. In the drawings, the dimensions of some of the elements may be exaggerated and thus not drawn to scale for illustrative purposes. The dimensions and the relative dimensions do not necessarily correspond to actual reductions to practice of the invention.

In addition, terms such as 'first', 'second', 'third', and the like are used in the description and in the claims in order to make a distinction between similar elements and not necessarily in order to indicate a sequential or chronological order. The terms in question are interchangeable under appropriate circumstances and the embodiments of the invention can operate in other sequences than described or illustrated herein.

Moreover, terms such as 'top', 'bottom', 'above', 'under' and the like in the description and the claims are used for descriptive purposes. The terms thus used are interchangeable under appropriate circumstances and the embodiments of the invention can operate in other orientations than described or illustrated herein.

The term 'comprising', or its derivatives, as used in the claims, should not be interpreted as being restricted to the means listed thereafter; the term does not preclude other elements or steps. The term should be interpreted as specifying the stated features, integers, steps or components referred to, but does not preclude the presence or addition of one or more other features, integers, steps or components, or groups thereof. Thus, the scope of an expression such as 'a device comprising means A and B' is not solely limited to devices consisting only of components A and B. In contrast, what is meant is that, with respect to the present invention, the only relevant components of the device are A and B.

As used herein, the term 'inert atmosphere' means an atmosphere in which less than 2% oxygen is present.

The present invention comprises a method and a system for decomposing organic waste, so that the volume and mass of the waste to be removed is considerably reduced relative to the initial volume and the original mass. The present invention also relates to the rendering harmless of those components of the processed waste that are released (e.g. exhaust gases) before they end up in the environment.

The present method will be described in particular with regard to radioactive waste, and in particular with regard to radioactive ion exchange resin, but other types of organic waste may be processed in accordance with the following process and with the components of the system. The organic wastes that can be processed according to the present invention therefore comprise not only ion exchange resins, but also, among other things, cleaning solutions for steam generators, solvents, oils, decontamination solutions, antifreeze, dirt, sludge, nitrates, phosphates and contaminated water.

An ion exchange resin is made from organic materials, usually styrene to which amino groups are grafted to make anion resins or to which sulfone groups are grafted to form cation resins. Since these resins are used to purify cooling water in a nuclear reactor, they accumulate up to about 7% iron, calcium, silica and small amounts of other metals and cations.

The method is based on pyrolysis in a closed reactor. The solid residue from the processing of the waste, namely an inorganic grain with a high metal oxide content, is packaged for subsequent storage for a period of 200 years to 300 years. The method can further utilise a conventional exhaust gas treatment (e.g. post-combustion), but also an oxidation of the waste gas as further described. Pyrolysis is the destruction of organic material with the aid of heat in the absence of a stoichiometric amount of oxygen, i.e. in an inert atmosphere. Hence, a reactor for use in the present invention should be substantially hermetically sealable.

In the present method, the organic components of the resin are destructively distilled by heating. Upon heating, the weak chemical compounds of the polymer resins break into compounds with lower carbon numbers, including carbon, metal oxides, metal sulphides, and pyrolysis gases, which in turn comprise carbon dioxide, carbon monoxide, water, nitrogen, and hydrocarbon gases. The small volume of solid residue that remains after pyrolysis contains the vast majority of the radionuclides.

Although pyrolysis can take place over a wide range of temperatures, the present method is a pyrolysis at low temperatures, generally about 300° C. to 600° C., to prevent radioactive metals from volatilising in the ion exchange resins. These metals are therefore retained in the residue of the reactor. As a result, the low-active synthetic pyrolysis gases can then be converted at higher temperatures into carbon dioxide and water without concern for volatile radioactive metals such as caesium.

Oxidation of the waste gas, e.g. the pyrolysis gas comprising hydrocarbons, is the destruction of an organic gas at high temperatures, where a minimum amount of oxygen gas must be present. Typically, the hydrocarbon vapours are converted to carbon dioxide and water at a temperature of at least 850° C. with a residence time of the gases of at least 2 seconds and an oxygen content of at least 6 vol %. This does not constitute combustion of the waste gas.

The system for processing the ion exchange resin comprises a frame 1 on which a collecting chamber 2 is mounted, in which the resin is transported by means of transport water, in particular via supply line (not shown) and inlet 3, which inlet can be closed via closing valve 9. Optionally, the transport water can be filtered from the collecting chamber 2 and discharged via a discharge line (not shown). The separation of the transport water results in a dryer resin, which lowers the residence time in the pyrolysis chamber.

Figure 2:
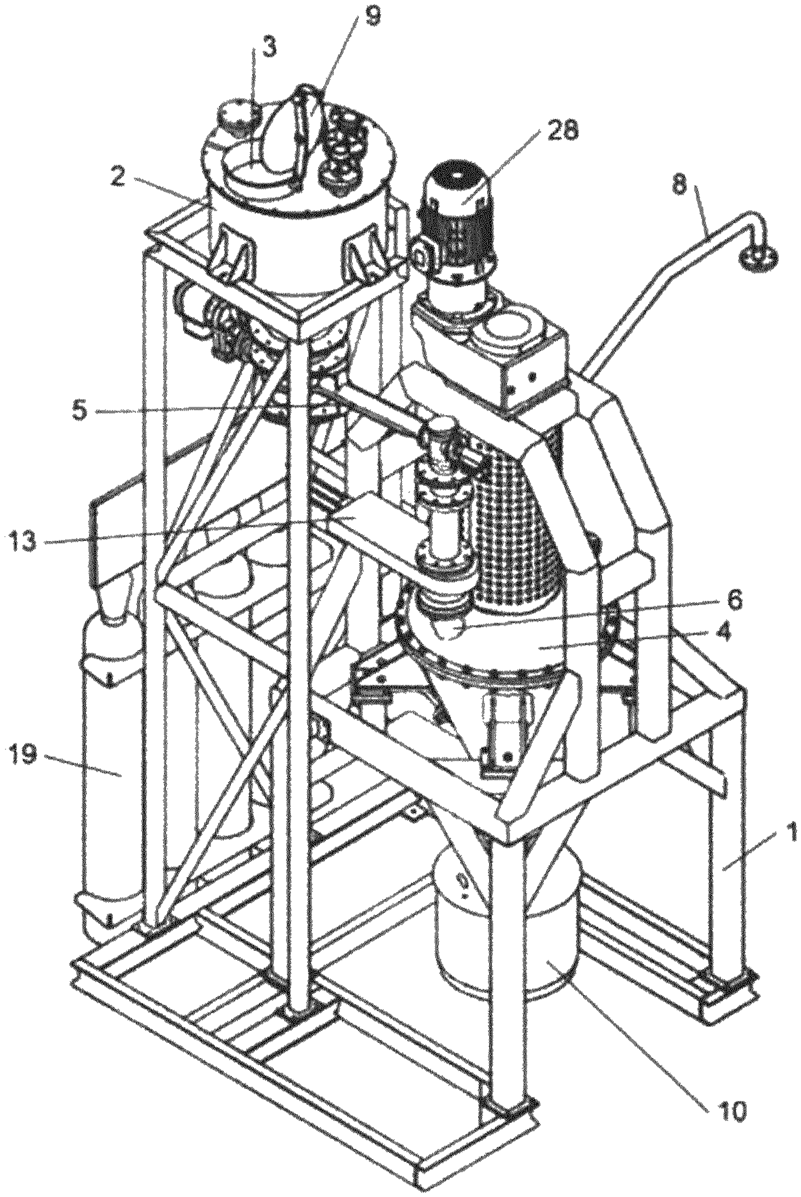
FIG. 2 shows a perspective view of the pyrolysis portion of the system of FIG. 1.
Figure 3:
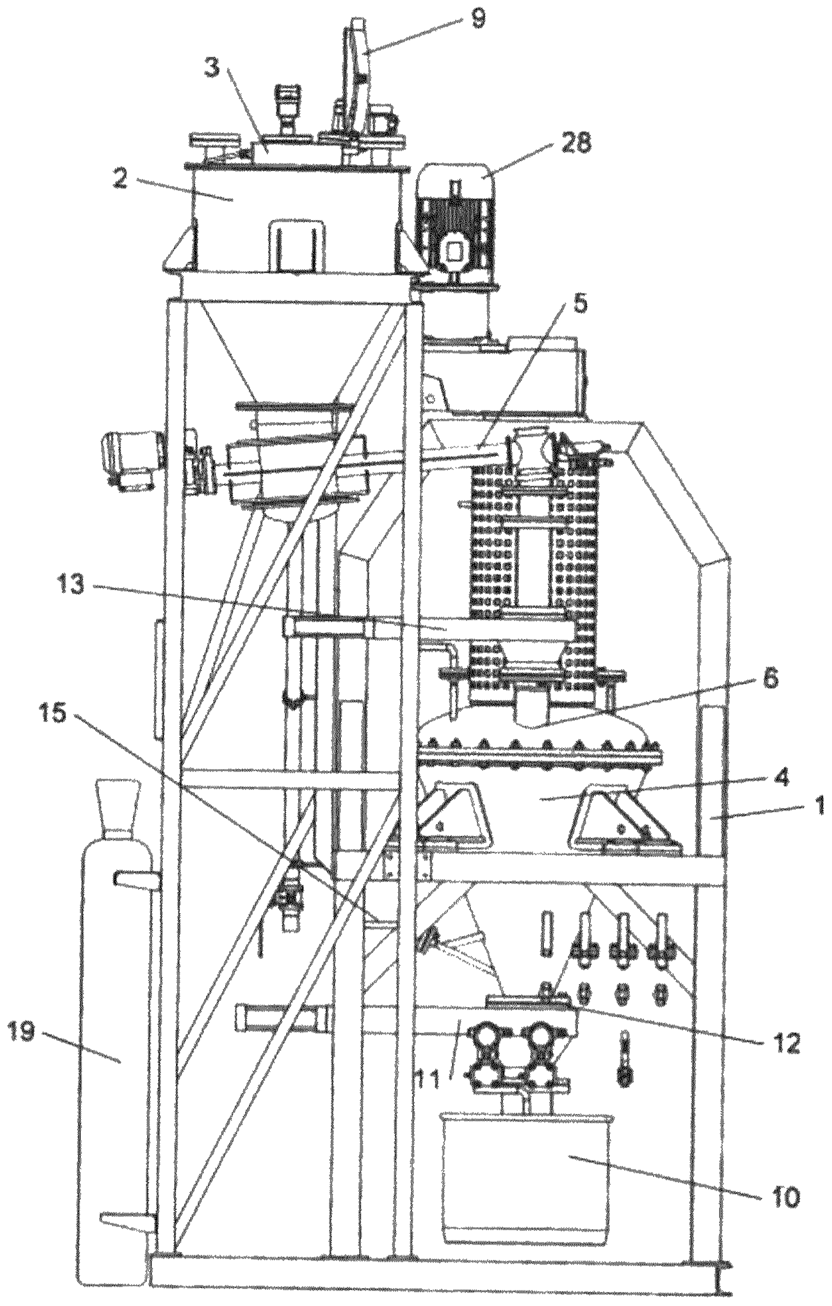
FIG. 3 shows a front view of FIG. 2.

From the collecting chamber 2, the resin (including or excluding the transport water) is transported to the conical pyrolysis chamber 4 via line 5 (shown in FIG. 2) and enter the housing 4 via inlet 6. In the pyrolysis chamber 4, the transport water is evaporated (if necessary) and the resin is dried and pyrolysed as described below. The waste gases generated by evaporation, drying and pyrolysis are discharged via gas outlet 7 connected to line 8. Due to gravity, the pyrolysed material falls down inside the housing 4 and leave it via outlet 12, which opens into a collection tray 10. In the embodiment shown, a sluice valve device 11 (shown in FIG. 3) is also provided between the outlet 12 and the collection tray 10. Such a sluice valve is then closed during use so that non-pyrolysed material cannot yet end up in the collection tray 10. A similar sluice valve device 13 (also shown in FIG. 3) is provided between the collection tray 2 and the inlet 6 of the pyrolysis chamber 4.

In order for the pyrolysis chamber 4 to be hermetically sealed, i.e. to ensure that substantially no oxygen is present inside the pyrolysis chamber 4, nitrogen gas is led from storage tanks 19 to each opening of the pyrolysis chamber 4. This nitrogen gas prevents oxygen gas from getting through one of the openings in the pyrolysis chamber 4 and thus disrupting the state of an inert atmosphere, causing an oxidation or combustion reaction which could lead to such high temperatures that the housing 4 could be damaged and/or an unsafe condition arises. It will be appreciated that the storage tanks 19 can also be replaced by another nitrogen supply, e.g. a nitrogen supply network.

Figure 4:
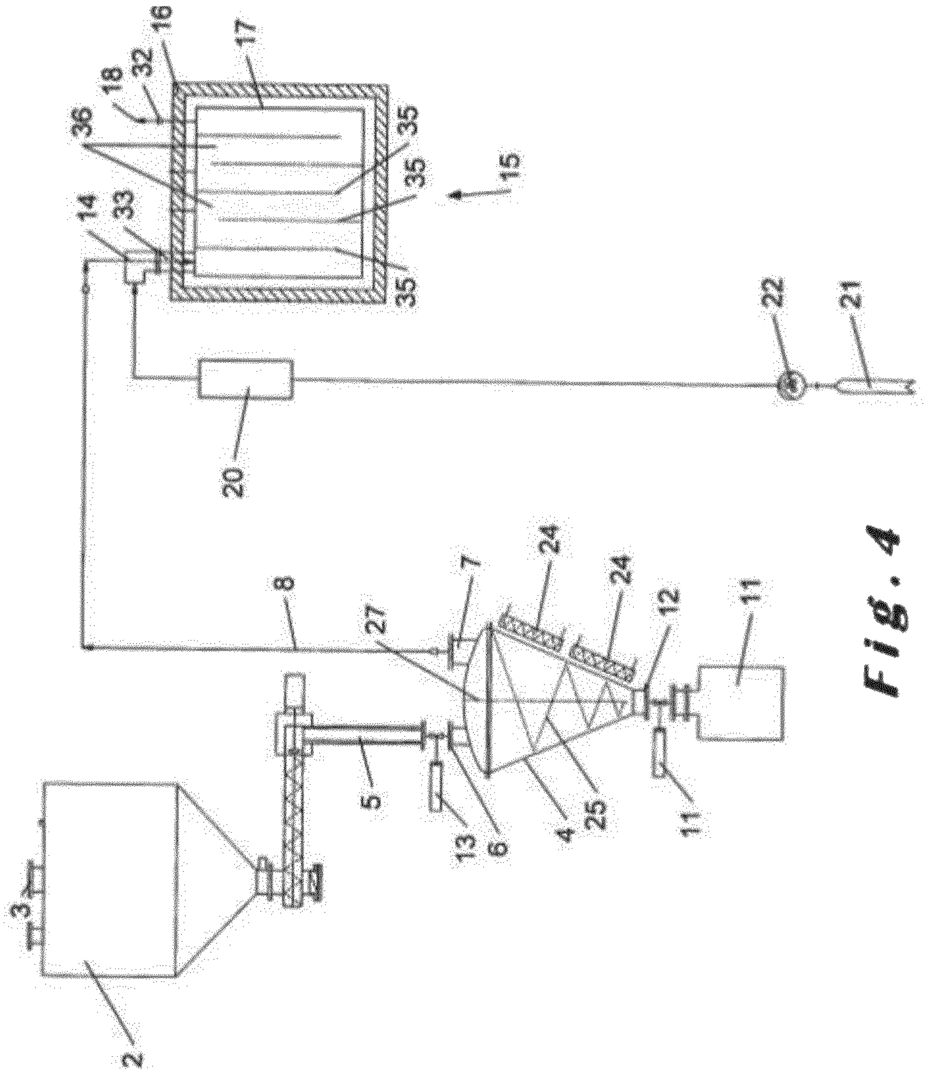
FIG. 4 shows a schematic representation of the system of FIG. 1.

As shown in FIG. 4, the conical housing 4 on the side wall is provided with heating means 24, in particular electric heating means, for heating the side wall. In an advantageous embodiment, these heating means 24 are incorporated in ceramic elements which are directly attached to the conical housing 4 and are suitable for generating a temperature within the housing 4 of at least 200° C., in particular at least 300° C., more in particular at least 400° C. and most in particular at least 500° C. The temperature that needs to be generated depends on the type of waste that needs to be processed and also on the phase the processing is in. For example, a temperature of 120° C. may suffice during the evaporation of the transport water, while a temperature of approximately 300° C. (depending on the type of resin) is required during the pyrolysis.

Inside the housing 4 a conical mixing body 25 is provided which is attached via cross connections 41 to a drive shaft 26 which extends through the upper side of the housing along said longitudinal direction with a first portion which is inside the housing 4 and a second portion which is outside the housing 4. The conical mixing body 25 is configured to fluidise waste inside the housing 4 by transporting it upwards along the side wall of the housing 4 by rotating the mixing body 25.

As shown schematically in FIG. 4, the mixing body 25 does not touch the housing 4 and the mixing body 25 has a free bottom side at the underside of the housing 24, as described above, to avoid accumulation of waste at the bottom of the housing 4. Such a construction is possible because the second portion of the drive shaft 26 is bearing-mounted on the frame 1 and therefore no mounting is required inside the housing 24. In particular, a double bearing is used when attaching the drive shaft 26 to the frame 1. As shown in FIG. 4, the drive shaft 26 extends in the longitudinal direction 27 of the housing 4. The drive shaft 26 is driven by an electric motor 28 shown in FIG. 1.

In an embodiment, the shortest distance between the mixing body 25 and the side wall of the housing 4 is at most 5% and in particular at most 3%, as described above, in order to avoid build-up of residue on the side wall.

The waste gas from the evaporation, drying and pyrolysis is supplied via line 8 to a supply line 14, which discharges into an inlet 33 of an oxidising device 15 (also known as an oxidiser). The supply line 14 is provided for supplying superheated oxygen gas, in particular superheated air (such as ambient air), which air was heated by means of a superheater 20 (shown schematically in FIG. 4). The oxygen gas can be provided in a tank 21 and supplied via pump 22 as shown in FIG. 4. The tank 21 is preferably the chamber in which the oxidiser 15 is located and the supplied air is hence ambient air. The pump 22 also determines how much oxygen gas is supplied and can also be used to control the speed (for example between 1 and 5 m/s) at which the mixture of oxygen gas and waste gas is supplied.

Figure 6:
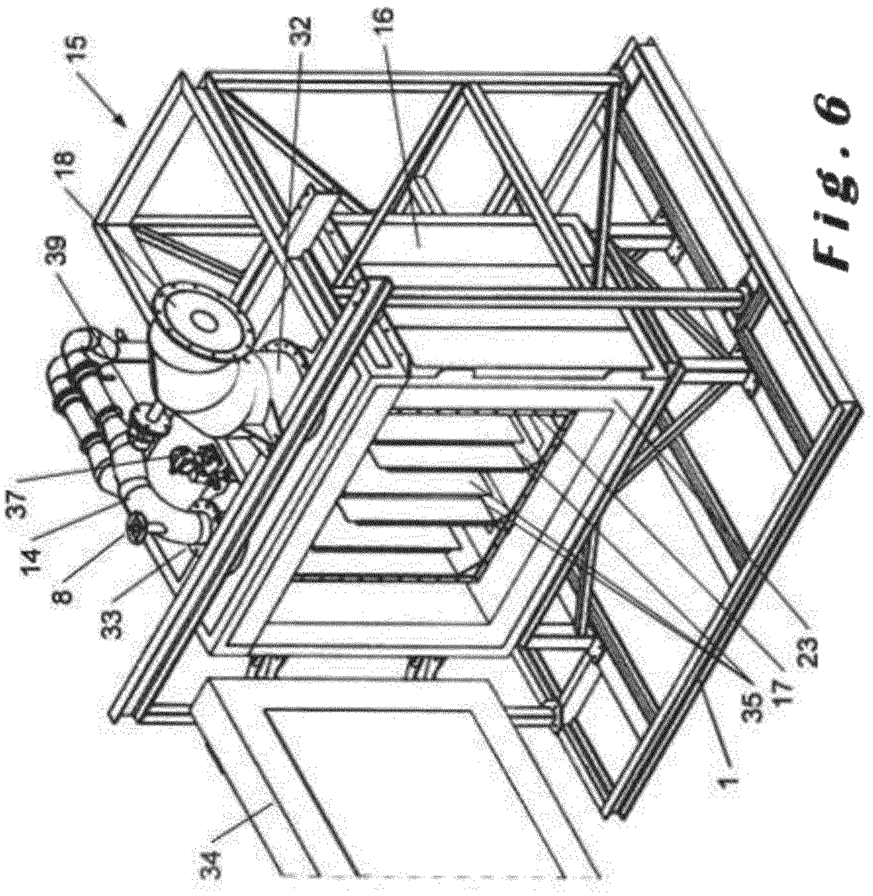
FIG. 6 shows a perspective view of the waste gas processing portion of the system of FIG. 1.
Figure 5:
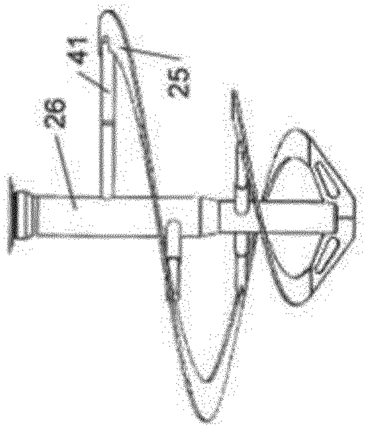
FIG. 5 shows a perspective view of the mixing device.

As shown in FIGS. 4 and 6, the oxidising device 15 comprises an outer chamber 16 and an inner chamber 17. Electric heating means 23 (shown in FIG. 7) are provided in the outer chamber 16 and heat the inner chamber 17, through which the mixture of waste gas and superheated air flows. This mixture is oxidised by the temperature so that an oxidised gas is discharged from the oxidising device 15 via outlet 32 and discharge line 18. The temperature of the superheated air (in particular at least 850° C., preferably at least 900° C. and more preferably almost 1000° C.) already ensures an initial heating of the waste gas such that the oxidation reaction already starts at the beginning of the inner chamber 17.

Figure 7:
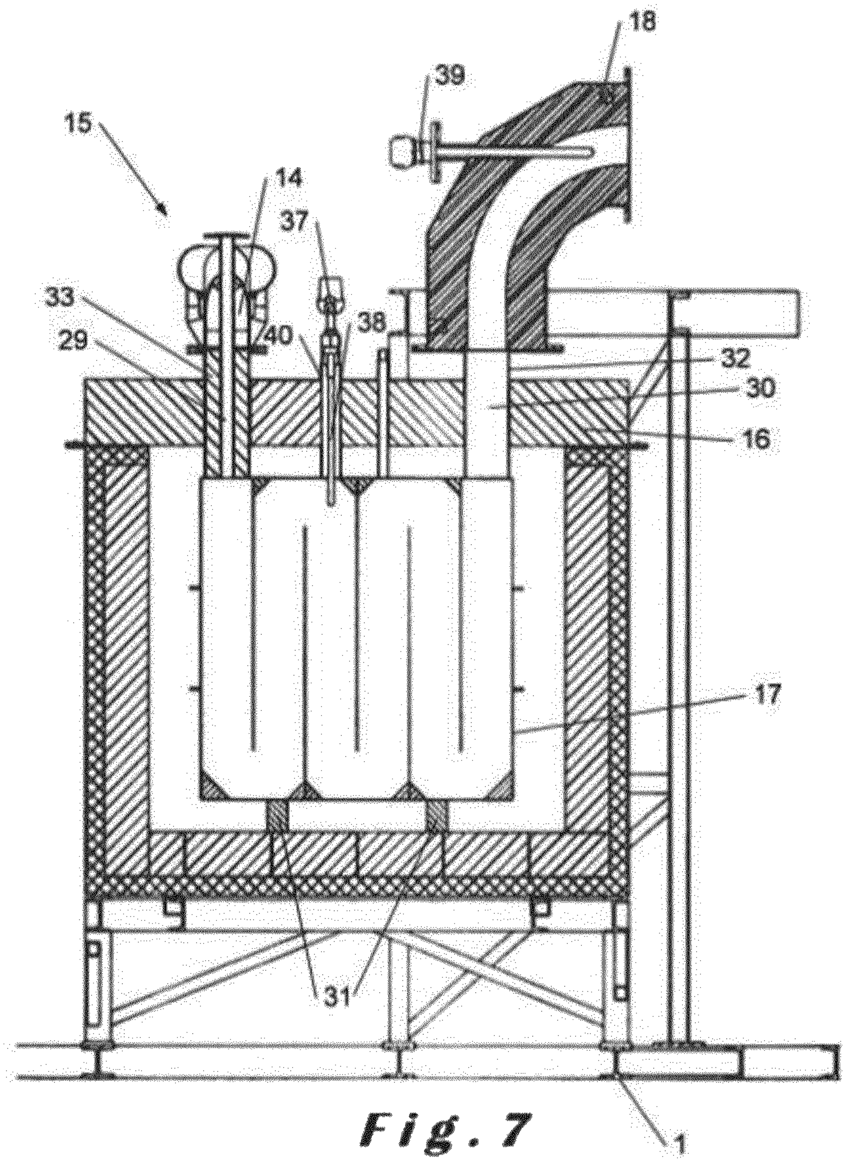
FIG. 7 shows a section through the oxidation portion of the system of FIG. 1.

The outer chamber 16 is provided with a front wall, a rear wall, a left wall, a right wall, an upper wall and a lower wall, each of which are provided on their inner side with electric heating means 23 schematically shown in FIG. 7, a depth of the outer chamber 16 being defined as a shortest distance between its front wall and its rear wall, a width of the outer chamber 16 being defined as a shortest distance between its left wall and its right wall and a height of its outer chamber 16 being defined as a shortest distance between its lower wall and its upper wall. The outer chamber 16 is further provided with a first opening 29 and a second opening 30, through which the supply line 14 and the discharge line 18 extend, respectively.

The inner chamber 17 is completely surrounded by the outer chamber 16 as shown in FIG. 6 and has dimensions that are as close as possible to the dimensions of the outer chamber 16. In particular, the height, depth and width are each at most 15%, in particular at most 10%, less than a respective one of the depth, width and height of the outer chamber 16. It has been found that such dimensions allow the inner chamber 16 to expand due to the high temperature, but also that the total volume of the outer chamber is as small as possible to form a compact oxidiser 15. As shown in FIG. 7, the inner chamber 17 is supported on the outer chamber 16 by fastening means 31 so that direct contact between the two chambers 16, 17 is avoided. This avoids damage to the heating means 23.

It is clear that the atmosphere within inner chamber 17 is substantially completely sealed off from the atmosphere around the inner chamber 17 in the outer chamber 16. In this way the gas to be oxidised is prevented from coming into contact with the outer chamber 17, in particular with the heating means 23.

In an embodiment, the heating means 23 are designed as ceramic elements which are provided on their side facing the outer chamber 16 with heat-resistant insulation.

In order to limit the dimensions of the oxidiser 15, the inner chamber 17 is provided with mutually substantially parallel partitions 35 which increase the residence time inside the inner chamber 17 relative to an identically dimensioned chamber without partitions. Due to these partitions 35, the mixture must flow through a series of substantially U-shaped loops 36 which stimulate the mixing of the gases.

Preferably, the corners of the U-shaped loops are rounded to avoid a vortex flow that could temporarily retain a portion of the waste gas, thereby reducing the efficiency of the oxidiser 15.

In the embodiment shown, the length of each partition 35 is approximately 85% of the height of the inner chamber 17, but other lengths are also possible. In general, this length is preferably between 60% and 95% of the height (or of the width or length if the partitions are oriented according to the width or length direction). It has been found that this allows sufficient flow and also maximises the total distance that the mixture has to travel based on the ideally as low as possible dimensions of the inner chamber 17.

The number of partitions 35 and the dimensions of the inner chamber 17 are selected based on the desired residence time of the mixture. This residence time is preferably at least 2 seconds. The pump 22 can also be used to adjust the flow rate so that, given a certain total distance, the residence time is sufficient.

To prevent damage to the partitions 35, these can also be provided with insulation (not shown). This is especially advantageous with the first partition since this is the hottest zone due to the supply of the superheated air. In addition, this wall of the inner chamber 17 is also insulated.

In the embodiment shown, use is made of an odd number of partitions 35 so that the openings 29, 30 can be provided in the same wall of the outer chamber 16, on which optionally no heating means 23 are then provided, but preferably insulation is provided.

In the embodiment shown, a third opening 38 is also provided in the outer chamber 16 to which a urea supply device 37 is connected via gas inlet 40 positioned within the opening 38. As described above, the supply of urea leads to the avoidance of the formation of nitrogen oxides during the oxidation. As shown, the urea supply device 37 is connected to the nearest U-shaped loop 36 such that the supplied urea has a sufficient residence time.

In an embodiment, the outer chamber 16 is provided with a door 34 that forms a wall thereof. This is advantageous since it allows the inner chamber 17 to be replaced or cleaned in its entirety. This also makes it possible to perform maintenance on the heating means 23.

In the embodiment shown, a control device 39 is also provided which checks what volume percentage of oxygen gas is present in the oxidised gas. If this is too low, a control mechanism is activated that adjusts pump 22 so that more oxygen gas is supplied. In this way, the desired oxygen gas percentage (e.g. 6 vol %) can be obtained and maintained throughout the entire inner chamber 17.

Although certain aspects of the present invention have been described with respect to specific embodiments, it is clear that these aspects may be implemented in other forms within the scope of protection as defined by the claims.

The invention claimed is:

1. System for batch processing radioactive waste by pyrolysing said radioactive waste into pyrolysed material and gasified material, said system comprising:

a frame;

a conical housing mounted on the frame and configured to substantially hermetically enclose said waste for a predefined residence time, which housing has a longitudinal direction, a side wall, an upper side and an underside and is provided with:

an inlet configured to communicate with a supply device to introduce said waste into the housing, the inlet being provided with closing means configured to close the inlet during the waste processing;

an outlet configured to communicate with a discharge device for discharging said pyrolysed material from the housing, which outlet is provided on the underside of the housing and with closing means configured to close the outlet during the waste processing; and a gas outlet configured to communicate with a gas discharge device for discharging said gasified material from the housing during the waste processing, a cross-section through the conical housing having a surface which substantially perpendicular to said longitudinal direction decreases downwards;

a mixing device mounted on the frame and provided with:

a drive shaft rotatably mounted relative to the housing, said drive shaft extending through the upper side of the housing along said longitudinal direction with a first portion located inside the housing and a second portion located outside the housing; and a conical mixing body inside the housing and configured to fluidise said waste, which mixing body is fixedly attached to the first portion of the drive shaft and substantially does not touch the housing; and heating means for heating the side wall of the housing.

2. System according to claim 1, wherein the second portion of the drive shaft is rotatably mounted on said frame by means of at least two bearings.

3. System according to claim 1, wherein the mixing body has a free bottom side that is located at substantially the same height as the underside of the housing.

4. System according to claim 1, wherein a shortest distance between the side wall of the housing and the mixing body measured in a cross-section through the conical housing which is substantially perpendicular to said longitudinal direction amounts to at most 5% of the maximum internal diameter of the housing.

5. System according to claim 4, wherein said shortest distance is substantially independent of the height at which the cross-section is taken.

6. System according to claim 1, wherein the mixing body is attached to said shaft with one or more cross connections such that, in use, the mixing body is configured to transport said waste upwards along the side wall of the housing.

7. System according to claim 1, wherein the heating means comprise electrical heating elements mounted on, preferably integrated into, the outside of the side wall of the housing, the electrical heating elements being configured to generate a temperature within the housing of at least 200° C.

8. System according to claim 1, wherein the system further comprises an inertisation device with at least one storage tank in which nitrogen gas is stored, the inertisation device comprising a plurality of conduits configured for supplying nitrogen gas to near at least one of the inlet or the outlet in the housing.

9. System according to claim 1, wherein the mixing device further comprises a drive configured for rotating the drive shaft, which drive is located outside said housing.

10. System according to claim 1, wherein the inlet of the housing is closed by a first sluice valve device and wherein the outlet of the housing is closed by a second sluice valve device.

11. System according to claim 1, wherein no ceramic and/or metal balls are present within the housing.

12. System according to claim 1, wherein said waste is comprises radioactive resin or radioactive sludge.

* * * * *